United States Patent [19]
Nelson

[11] 3,749,283
[45] July 31, 1973

[54] FUEL DISPENSING SYSTEM WITH INDICATOR VERIFICATION MEANS

[75] Inventor: Howard W. Nelson, Middletown, Conn.

[73] Assignee: Veeder Industries, Inc., Hartford, Conn.

[22] Filed: Sept. 27, 1971

[21] Appl. No.: 184,098

[52] U.S. Cl. .................................. 222/27
[51] Int. Cl. ................................ B67d 5/16
[58] Field of Search ............... 222/70, 26, 27, 25, 222/20; 235/92 CA; 178/23 A; 250/213 A

[56] References Cited
UNITED STATES PATENTS
3,543,008  11/1970  Kes et al. .................. 222/26 X Primary Examiner—Stanley H. Tollberg
Attorney—John M. Prutzman, James E. Alix et al.

[57] ABSTRACT

A fuel dispensing system is provided with an indicator verification system for confirming the operability of segmented numeral indicators comprising a control unit operable between ON and OFF positions; synchronizer logic circuitry for sequentially visualizing and blanking all segments of the segmented numeral indicators and a timer circuit for programming the operation of the synchronizer circuit. The control unit is operatively connected to the synchronizer logic circuitry and to the timer circuit for activating the synchronizer to visualize all segments of the indicators and initiate operation of the timing circuit upon operation of the control means to its ON position. Timed interval operation of the timer circuit automatically terminates full segment visualization, initiates and terminates blanking of the indicators, resets the counters of the fuel dispensing system and conditions the fuel dispensing system for dispensing fuel. Upon completion of the fuel delivery, operation of the control unit to its OFF position initiates recycling of the verifying sequence followed by termination of the indicator display readout after an appropriate time interval.

10 Claims, 1 Drawing Figure

PATENTED JUL 31 1973 3,749,283
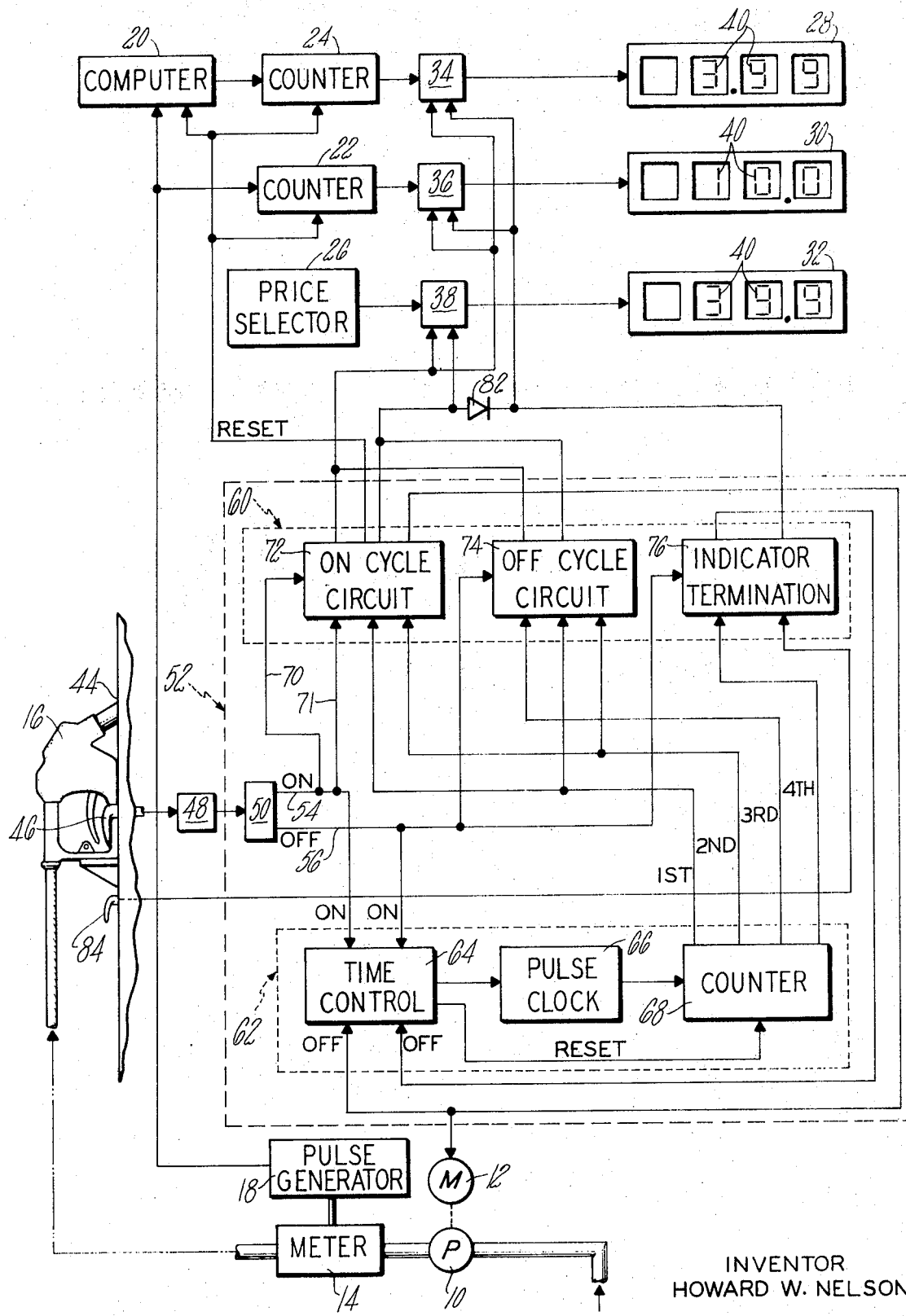
INVENTOR
HOWARD W. NELSON
BY James E. Alix
ATTORNEY

FUEL DISPENSING SYSTEM WITH INDICATOR VERIFICATION MEANS

BACKGROUND AND SUMMARY OF THE INVENTION

The present invention relates generally to an indicator verification system for confirming the operability of segmented numeral indicators. In particular it is concerned with a new and improved indicator verification system of the type described having particular usefulness in fuel dispensing systems utilizing indicators for indicating information respecting the delivery of fuel, for example, the established unit volume fuel price and the volumetric and monetary amounts of the fuel delivery.

In recent years increased interest has been evidenced in the utilization of optical display devices in the readout packages of fuel dispensing apparatus for indicating the unit price, volumetric amount and total cost of the fuel delivered. A typical example of the use of such a device is shown in U. S. Pat. No. 3,580,421, issued May 25, 1971 to John H. Bickford and entitled "Fluid Dispensing Apparatus Indicator System." Such indicating systems employ liquid crystal electro-optical display units, such as the seven segment numeral indicator display units. Use of such segmented numeral indicators has raised the possibility of numerical error due to the faulty operation of a single segment of the indicator. This could result in an incorrect reading and either the customer or the attendant or both could easily be unaware of the error. For example, if a center bar segment of a seven segment numeral indicator were broken, the figure "8" would always appear as "0." Conversely, if the center bar were shorted and remained on continuously, a "0" would always appear as an "8." As can be appreciated, other failures in one or more segments could produce correspondingly confusing display indications which might go unobserved.

Accordingly, it is a principal object of the present invention to provide a new and improved indicator verification system for confirming the full operability of segmented numeral indicators.

Another object of the present invention is to provide an indicator verification system of the type described that will automatically cross check the operability of all segments in segmented numeral indicators in an extremely rapid and reliable manner without interfering with the normal fluid dispensing operation.

A further object of the present invention is to provide a fuel dispensing device incorporating an indicator verification system of the type described suited for automatic operation at an appropriate stage in the fuel delivery sequence to avoid human error and assure dependable operation of the indicators regardless of the manner in which the fuel delivery is marketed.

A still further object of the present invention is to provide a fuel delivery system of the type described incorporating an electronic indicator verification sequence of automatic and programmed operation for use with segmented numeral indicator units. Included in this object is the provision for a verification system exhibiting high reliability and compact size yet being capable of operation under the rigorous environmental conditions encountered in fuel dispensing locations, including wide temperature fluctuations, electrically noisy environments, and highly contaminated conditions including high fuel vapor and dust levels.

Other objects will be in part obvious and in part pointed out in more detail hereinafter.

These and related objects are accomplished in accordance with the present invention by providing a fuel dispensing system with an indicator verification system for confirming the operability of segmented numeral indicators. The verification system comprises control means operable between ON and OFF positions; synchronizer logic circuitry for sequentially visualizing and blanking all segments of the segmented numeral indicators and a timer circuit for programming the operation of the synchronizer. The control means is operatively connected to the synchronizer and the timer circuits for activating the synchronizer to visualize all segments of the indicators and initiate operation of the timing circuit upon operation of the control means to its ON position. Upon initiation of the timer circuit, it automatically terminates full segment visualization, initiates and terminates blanking of the indicators and conditions the fuel dispensing system for dispensing fuel.

Upon completion of the fuel delivery and operation of the control means to its OFF position the timer circuit is activated to effect termination of the indicator display after an appropriate time interval. Alternatively, the automatic verification can take place when the control means is operated to its OFF position but prior to termination of the indicator display or both before and after fuel delivery.

A better understanding of the objects, advantages, features, properties and relationships of the invention will be obtained from the following detailed description and accompanying drawing which set forth an illustrative embodiment and are indicative of the way in which the principles of the invention are employed.

BRIEF DESCRIPTION OF THE DRAWING

The single FIGURE of the drawing is a block and schematic diagram of a portion of a fuel dispensing system incorporating the indicator verification system of the present invention.

DESCRIPTION OF THE PREFERRED EMBODIMENT

Referring now to the drawing in greater detail, a gasoline dispensing system incorporating an embodiment of an indicator verification system of the present invention is shown comprising a fuel pump 10 operated by an electric motor 12 for pumping fuel from a supply reservoir (not shown) through a fuel meter 14 to a fuel delivery nozzle 16. The fuel meter 14 is suitably connected to a pulse generator 18 for generating a single train of pulses as gasoline is dispensed by the nozzle 16. The pulses from the generator 18 are fed to a cost computing device 20 and volume counter 22 to continuously register the volumetric amount of fuel delivered by the delivery nozzle and simultaneously compute the momentary amount of fuel delivered in accordance with the volumetric amount of fuel and established unit volume price. The cost computer 20 in turn controls the operation of the cost counter 24, and the cost counter 24, volume counter 22 and price selector 26 control the operation of the respective cost, volume and unit price indicator devices 28, 30 and 32. In the preferred embodiment the volume and cost counters 24, 22 and the price selector 26 provide a binary coded decimal output to decoder-driver circuits 34, 36, 38 respectively for operating the segmented numeral indicators, generally designated 40, in the respective cost volume and price indicating devices.

A storage receptacle 44 is provided for the fuel dispensing nozzle 16 and a control handle 46 is shown mounted adjacent the storage receptacle 44 in such a manner as to require the handle 46 to be turned to a vertical or OFF position, as shown in the drawing, before the nozzle 16 can be returned to its storage receptacle and to permit the handle 46 to be turned counter-clockwise to its horizontal or ON position only after the nozzle 16 has been removed from the storage receptacle 44. As will be appreciated, the storage receptacle and control handle can be combined as a single unit, such as a nozzle boot, and equipped for automatic operation to the ON position upon removal of the nozzle from the boot and to its OFF position upon return of the nozzle to the boot.

In accordance with the present invention the control handle 46 is connected through a switch 48 to a control unit 50 of an indicator verification system, designated generally by the numeral 52. The control unit 50 is operating between ON and OFF positions to alternatively activate the leads 54, 56 operatively connected to the segmented numeral indicators 40 in the cost, volume and price indicating devices for verification thereof. The verification sequence is programmed to start upon operation of the control handle 46 and control unit 50 to their respective ON positions and to automatically continue through visualization, ripple blanking and resetting of the indicators, all within an extremely short period of time, followed by actuation of the pump motor 12 to condition the fuel delivery system for delivering fuel.

Referring now specifically to the indicator verification system 52, it is shown as being comprised essentially of the control unit 50 and two hybrid micro circuits–a master synchronizer logic circuit, generally designated 60, interconnected with the indicators 40 through their respective decoder-driver circuits 34, 36, 38 for controlling the verifying operation of the indicators and a timer circuit 62 providing pulses or signals to the synchronizer 60 at various time intervals. As shown, the timer circuit 62 consists of a time control unit or circuit 64 for operating a pulse generating clock 66 for feeding a stream of pulses to a suitable electronic counter 68. The synchronizer 60 consists of suitable solid state logic circuitry for providing a sequential switching or stepping function under the control of the control unit 50 in its ON and OFF position in response to pulses received from the timer circuit 62. For clarity of description and ease of understanding the synchronizer has been illustrated as comprising an ON cycle circuit 72, an OFF cycle circuit 74 and an indicator termination circuit 76.

Upon operation of the control unit 50 to its ON position, that is, upon activation of lead 54, both the synchronizer 60 and timer circuit 62 are activated or brought to their ON condition. The ON cycle circuit 72 is illustrated schematically as being brought to its ON condition by the lead 70 and its operation is simultaneously initiated, as indicated by the lead 71, to send a signal to the decoder-driver circuits 34, 35, 36 to energize and visualize all segments of the segmented numeral indicators 40. As a result "eights" will display at every indicator 40 in the cost, volume and price indicating units.

As mentioned, activation of the lead 54 also is effective to initiate, or bring to its ON condition, the time control unit 64 which, in turn, directs the pulse source 66 to start feeding pulses to the electronic counter 68. After a predetermined count by the electronic counter 68, a first instructional pulse is emitted by the electronic counter and fed to the ON cycle circuit 72. The first instructional pulse is effective to step or switch the ON cycle circuit 72 to its reset and ripple blanking output condition. The reset signal flows to the computer 20 and the volume and cost counters, 22 and 24, for resetting those devices. However, the reset condition does not appear on the indicators 40 due to the overriding ripple blanking signal passing directly to the decoder-driver circuits 34, 36, 38 to blank all segments of the segmented numeral indicators.

As will be appreciated, the first instructional pulse emitted by the electronic counter 68 should occur after a sufficient time interval has been provided for the attendant and/or customer to view the indicators and determine the operability thereof under the existing "eights" condition. Accordingly, the first instructional pulse is emitted within a predetermined time interval after the control unit 50 is operated to its ON condition. Generally, the time interval is well below 30 seconds and preferably less than 5 seconds. In fact, it has been found that satisfactory results are achieved with a time interval of only one second after initiation of the system. Thus, full visualization of the indicators in their "eights" condition need only be flashed for a period of approximately one second.

The electronic counter 68 continues its operation and after an additional predetermined count emits a second instructional pulse to the ON cycle circuit 72 terminating the reset and ripple blanking signals and permitting the reset cost and volume counters, 24 and 22, to return their respective indicator units, 28 and 30, to a reset or "0" condition. The price selector 26 will, of course, return the price indicator unit 32 to its appropriate display reading. Simultaneously, the ON cycle circuit 72, in response to the second instructional pulse, will activate the pump motor 12 and condition the fuel dispensing system for dispensing fuel.

The ripple blanking operation need only be maintained for a time interval similar to the period used for displaying all "eights", namely for 1 second. Accordingly, only 2 seconds need elapse between the time the control unit 50 is operated to its ON position and the activation of the pump motor 12 to condition the fuel dispensing system for dispensing fuel. Additionally, it will be appreciated once the pump motor 12 has been activated and the indicator verification system has completed its sequence of operations with the control unit 50 in the ON condition, it is no longer necessary to maintain the time control circuit 64 in its activated condition and the signal that turns on the pump motor may also be effective to turn off the timer control circuit 64 and to reset the electronic counter 68.

Upon completion of the fuel delivery the control handle 46 is operated to its OFF position thereby switching the control unit 50 to its OFF condition and energizing the OFF lead 56 to activate both the OFF cycle circuit 74 and indicator termination circuit 76 while simultaneously reactivating the time control circuit 64 of the timer circuit 62. The time control circuit 64 will, of course, restart the pulse clock 70 and the electronic counter 68. The OFF cycle circuit 74 is designed to respond to the first and second instructional pulses from the electronic counter 68 only after receipt of a third instructional pulse. Since the fuel delivery has been completed and the cost and volume information must be available to the attendant and/or customer, the time interval prior to output of the third instructional pulse is of substantial length, that is, on the order of 8 to 30 seconds and preferably about 16 seconds. After this preselected period the electronic counter emits a third instructional pulse to the activated OFF cycle circuit 74 to produce an output signal for effecting visualization or energization of all segments of the segmented numeral indicators. In other words, all indicators are again brought to their "eights" condition after activation of the visualization output of the OFF cycle circuit 74, the next first instructional pulse, emitted by the electronic counter after one second, is effective to step the OFF cycle circuit 74 in a manner similar to that accomplished by the first instructional pulse acting on the ON cycle circuit 72 except for the resetting function, namely the circuit 74 will emit a blanking signal to effect ripple blanking of all segments of the segmented numeral indicators of the cost, volume and unit price indicating devices. After a predetermined time interval, such as one second, a second instructional pulse is emitted by the electronic counter 68 to interrupt the ripple blanking signal and return the indicators to their display condition as controlled by counters 22, 24 and price selector 26.

After the appropriate predetermined time interval, the third instructional pulse from the electronic counter initiates another sequence of the automatic indicator verification system and the recycling continues until the counter 68 emits its fourth instructional pulse. As will be appreciated, the indicators display the total cost, volume and unit price of the prior delivery between cycles of the indicator verification system when the control unit 50 is in its OFF position. Thus, an automatic verification of the proper functioning of the indicators continues until a fourth instructional pulse is emitted by the electronic computer 68 to the indicator termination circuit 76 after an appropriately long period, such as about 4 to 5 minutes and preferably 4¼ minutes after the fuel delivery has terminated.

Since it is preferable that the unit volume price indicator 32 remains energized despite the deenergization of the remaining indicators 28, 30 to conserve their useful life, a unidirectional device, such as a rectifier 82, is placed in the ripple blanking line between the decoder-driver 38 and the remaining decoder-drivers 34, 36 to permit deenergization of only the cost and volume indicators by the indicator termination circuit 76. Thus, the fourth instructional pulse from the electronic counter 68 is effective for emitting a signal from the indicator termination circuit 76 for turning off only those indicators in the cost and volume indicating devices. However, the fourth instructional pulse is also effective to emit an additional signal from the indicator termination circuit 76, namely a signal for turning off the time control circuit 64 and resetting the electronic counter 68 for a subsequent fuel delivery operation.

Since either the attendant or customer may desire to again observe the total volume and cost indicators even after the lapse of 4 or 5 minutes, a suitable override handle 84 is provided for breaking the ripple blanking circuit to the cost and volume indicators thereby permitting the counters 22, 24 to again effect a visual display of the prior delivery. Preferably the override handle 84 is biased into its inoperative position so that upon its release the indicators once again will be deenergized to conserve their useful life.

As will be apparent to persons skilled in the art, various modifications, adaptations and variations of the foregoing specific disclosure can be made without departing from the teachings of the present invention.

I claim:

1. In a fluid dispensing system having a plurality of segmented numerical indicators for registering different numerical amounts respecting the delivery of fluid and control means activating and deactivating the dispensing system, the combination including an indicator verification system for confirming the operability of the segmented numeral indicators comprising verification synchronizer means for energizing and deenergizing all segments of said segmented numeral indicators and programming means for programming the operation of said synchronizer means, said control means being operatively connected to said verification synchronizer and programming means for activating said synchronizer means for initiating automatic energization and deenergization of said indicators and terminate operation of the verification sequence.

2. The fluid dispensing system of claim 1 wherein the indicator verification system includes a control unit responsive to the control means of the dispensing system for operation between OFF and ON conditions, said control unit being effective to activate said programming means upon operation between its OFF and ON conditions, said synchronizer means being operatively connected to the programming means for deactivating said programming means upon completion of the desired verification sequence.

3. The fluid dispensing system of claim 1 wherein the synchronizer means includes stepping means responsive to the programming means for initiating and terminating the deenergization of said indicators and automatically deactivating said programming means.

4. The fluid dispensing system of claim 1 wherein the synchronizer means and programming means are micro circuits.

5. The fluid dispensing system of claim 4 wherein the programming circuit includes a counter operable upon receipt reaching a predetermined count to transmit a signal, said synchronizer circuit including stepping means operative to energize all segments of the indicators and responsive to the signals from said counter to deenergize all segments of said indicators, reset said indicators to a predetermined numerical display and condition the fluid delivery system for delivering fluid.

6. In a fuel dispensing system having a delivery nozzle for delivering fuel, a plurality of segmented numerical indicators for registering different numerical amounts respecting the delivery of fuel by the nozzle, and a dispensing system control associated with the nozzle and operable between ON and OFF positions for activating and deactivating the dispensing system, the combination including an indicator verification system for confirming the operability of the segmented numeral indicators comprising verification sequencing means including ON and OFF stepping means for visualizing and blanking all segments of said segmented numeral indicators, timing means for programming the operation of said sequencing means and verification control means operative between ON and OFF conditions in response to the operation of said dispensing system control between its corresponding ON and OFF positions to selectively activate said ON and OFF stepping means and simultaneously activate said timing means, said stepping means effective upon activation to visualize all segments of the indicators, said timing means being operative upon activation to automatically initiate operation of the activated stepping means for blanking said indicators for a programmed time interval.

7. The system of claim 6 wherein the ON stepping means is operative for conditioning the fuel dispensing system for dispensing fuel upon completion of the blanking operation.

8. The system of claim 6 wherein said timing means includes a counter operative for transmitting signals to the activated OFF stepping means, said activated OFF stepping means being operative upon receipt of a selected signal from said counter for visualizing said indicators and upon receipt of a subsequent signal to sequentially blank said indicators and permit a numerical display thereon.

9. The fuel dispensing system of claim 6 wherein the indicator verification system includes means associated with said sequencing means and timing means responsive to the operation of said control means to its OFF condition to deactivate the segmented numeral indicators upon termination of a predetermined time interval.

10. The system of claim 9 including override means to reactivate said indicators for visualization of the deactivated numerical display.

* * * * *